US012683947B2

(12) United States Patent
Landais et al.

(10) Patent No.: US 12,683,947 B2
(45) Date of Patent: Jul. 14, 2026

(54) METHOD AND APPARATUS RELATED TO AUTHORISATION TOKENS FOR SERVICE REQUESTS

(71) Applicant: Nokia Technologies Oy, Espoo (FI)

(72) Inventors: Bruno Landais, Pleumeur-Bodou (FR); Horst Thomas Belling, Erding (DE); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 282 days.

(21) Appl. No.: 18/190,494

(22) Filed: Mar. 27, 2023

(65) Prior Publication Data

US 2023/0308429 A1 Sep. 28, 2023

(30) Foreign Application Priority Data

Mar. 28, 2022 (IN) .............................. 202241018030

(51) Int. Cl.
H04L 9/40 (2022.01)
H04L 67/56 (2022.01)
(52) U.S. Cl.
CPC ........ H04L 63/0807 (2013.01); H04L 63/105 (2013.01); H04L 67/56 (2022.05)
(58) Field of Classification Search
CPC .............. H04L 63/0807; H04L 9/3213; H04L 63/0815
See application file for complete search history.

(56) References Cited

U.S. PATENT DOCUMENTS

| | | | | |
|---|---|---|---|---|
| 2021/0385217 A1* | 12/2021 | Benko | .................. | H04L 9/3073 |
| 2022/0086734 A1* | 3/2022 | Aggarwal | ........... | H04L 63/0884 |
| 2022/0338104 A1* | 10/2022 | Son | ........................ | H04W 12/06 |
| 2022/0353263 A1* | 11/2022 | Choyi | .................... | H04L 12/12 |

FOREIGN PATENT DOCUMENTS

| | | | | | |
|---|---|---|---|---|---|
| EP | 2874369 A1 * | 5/2015 | ......... | H04L 63/0281 |
| EP | 3962136 A1 | 3/2022 | | |

OTHER PUBLICATIONS

Extended European Search Report received for corresponding European Patent Application No. 23164535.9, dated Aug. 7, 2023, 11 pages.
"3rd Generation Partnership Project; Technical Specification Group Core Network and Terminals; 5G System; Technical Realization of Service Based Architecture; Stage 3 (Release 17)", 3GPP Ts 29.500, V17.6.0, Mar. 2022, pp. 1-126.

(Continued)

*Primary Examiner* — Esther B. Henderson
(74) *Attorney, Agent, or Firm* — Nokia Technologies Oy

(57) ABSTRACT

A technique comprising: sending to a proxy function from a client function a first service request for which the client function delegates to the proxy function discovery, via a network repository function, of a service producer for the first service request; receiving at the client function in reply to the service request a service response, wherein the service response includes an authorisation token indicating a token scope; and in response to a determination that the indicated token scope at least partly matches a requested scope for a second service request regardless of whether the token scope fully matches the requested scope, including the authorisation token in the second service request.

14 Claims, 7 Drawing Sheets

(56)  References Cited

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.5.0, Mar. 2022, pp. 1-298.

"3rd Generation Partnership Project; Technical Specification Group Services and System Aspects; Security architecture and procedures for 5G system (Release 17)", 3GPP TS 33.501, V17.5.0, Mar. 2022, pp. 1-293.

"3rd Generation Partnership Project; Technical Specification Group Core Network and Terminals; 5G System; Technical Realization of Service Based Architecture; Stage 3 (Release 17)", 3GPP TS 29.500, V17.5.0, Dec. 2021, pp. 1-117.

"3rd Generation Partnership Project; Technical Specification Group Core Network and Terminals; 5G System; Network Function Repository Services; Stage 3 (Release 17)", 3GPP TS 29.510, V17.4.0, Dec. 2021, pp. 1-284.

"3rd Generation Partnership Project; Technical Specification Group Services and System Aspects; Security architecture and procedures for 5G system (Release 17)", 3GPP TS 33.501, V17.4.2, Jan. 2022, pp. 1-287.

"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

"3rd Generation Partnership Project; Technical Specification Group Core Network and Terminals; 5G System; Principles and Guidelines for Services Definition; Stage 3 (Release 17)", 3GPP TS 29.501, V17.5.0, Mar. 2022, pp. 1-80.

\* cited by examiner

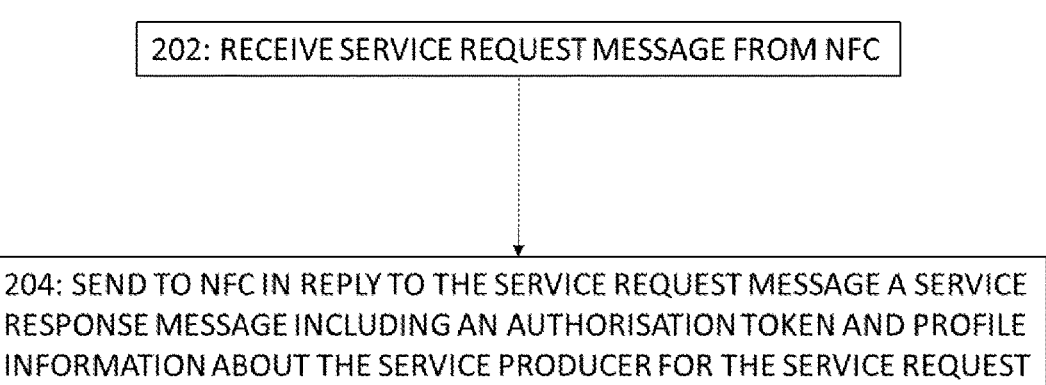

202: RECEIVE SERVICE REQUEST MESSAGE FROM NFC

204: SEND TO NFC IN REPLY TO THE SERVICE REQUEST MESSAGE A SERVICE RESPONSE MESSAGE INCLUDING AN AUTHORISATION TOKEN AND PROFILE INFORMATION ABOUT THE SERVICE PRODUCER FOR THE SERVICE REQUEST

Figure 7

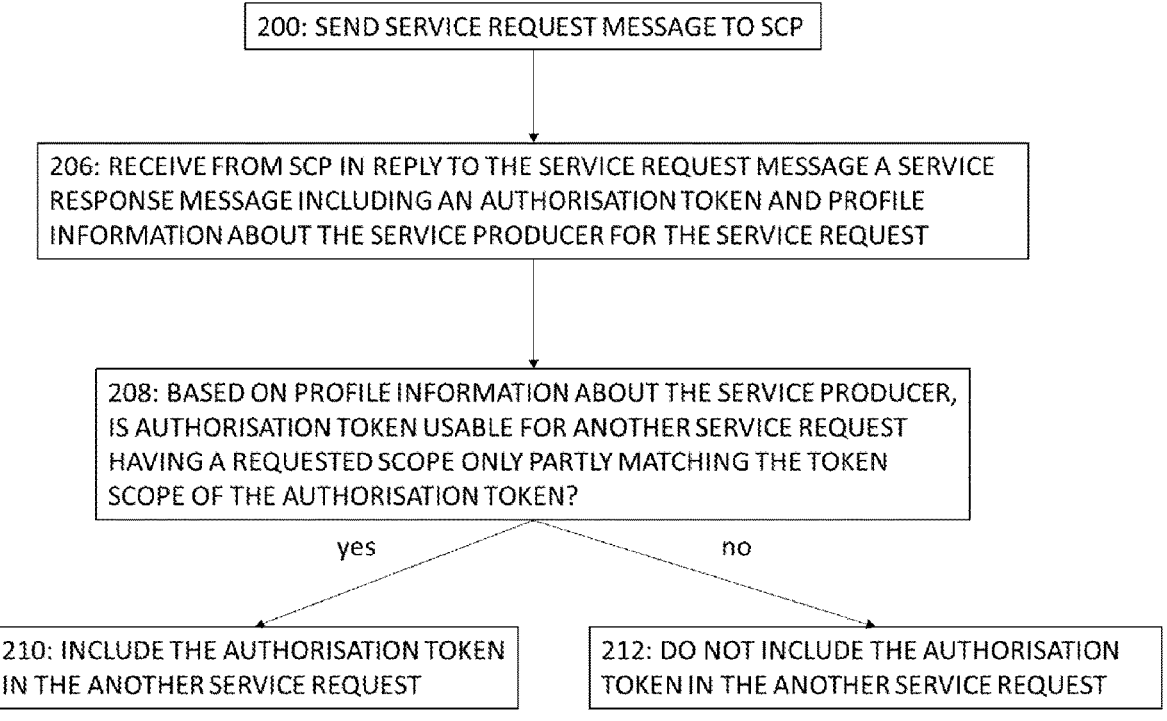

200: SEND SERVICE REQUEST MESSAGE TO SCP

206: RECEIVE FROM SCP IN REPLY TO THE SERVICE REQUEST MESSAGE A SERVICE RESPONSE MESSAGE INCLUDING AN AUTHORISATION TOKEN AND PROFILE INFORMATION ABOUT THE SERVICE PRODUCER FOR THE SERVICE REQUEST

208: BASED ON PROFILE INFORMATION ABOUT THE SERVICE PRODUCER, IS AUTHORISATION TOKEN USABLE FOR ANOTHER SERVICE REQUEST HAVING A REQUESTED SCOPE ONLY PARTLY MATCHING THE TOKEN SCOPE OF THE AUTHORISATION TOKEN?

yes                    no

210: INCLUDE THE AUTHORISATION TOKEN IN THE ANOTHER SERVICE REQUEST

212: DO NOT INCLUDE THE AUTHORISATION TOKEN IN THE ANOTHER SERVICE REQUEST

Figure 8

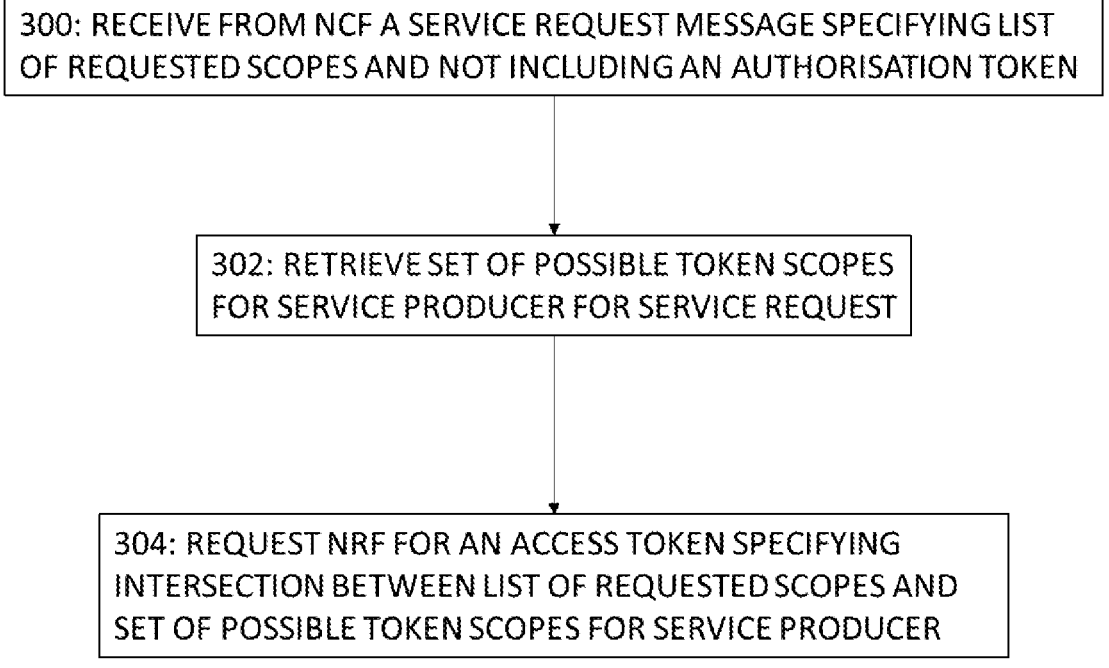

300: RECEIVE FROM NCF A SERVICE REQUEST MESSAGE SPECIFYING LIST OF REQUESTED SCOPES AND NOT INCLUDING AN AUTHORISATION TOKEN

302: RETRIEVE SET OF POSSIBLE TOKEN SCOPES FOR SERVICE PRODUCER FOR SERVICE REQUEST

304: REQUEST NRF FOR AN ACCESS TOKEN SPECIFYING INTERSECTION BETWEEN LIST OF REQUESTED SCOPES AND SET OF POSSIBLE TOKEN SCOPES FOR SERVICE PRODUCER

Figure 9

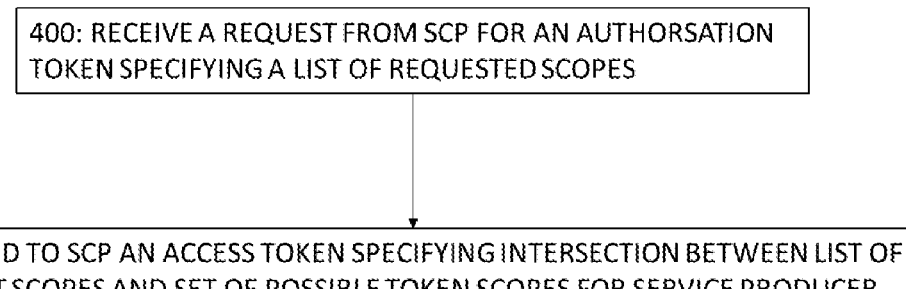

400: RECEIVE A REQUEST FROM SCP FOR AN AUTHORSATION TOKEN SPECIFYING A LIST OF REQUESTED SCOPES

402: SEND TO SCP AN ACCESS TOKEN SPECIFYING INTERSECTION BETWEEN LIST OF REQUEST SCOPES AND SET OF POSSIBLE TOKEN SCOPES FOR SERVICE PRODUCER

Figure 10

METHOD AND APPARATUS RELATED TO AUTHORISATION TOKENS FOR SERVICE REQUESTS

RELATED APPLICATIONS

This patent application claims the benefit of priority of Indian Patent Application No. 202241018030, filed Mar. 28, 2022, which is hereby incorporated by reference as if reproduced in its entirety.

TECHNICAL FIELD

The present disclosure relates to apparatus, a method, and a computer program, and in particular, but not exclusively to apparatus, methods and computer programs related to authorisation tokens for service requests.

BACKGROUND

The operation of a core network for a mobile communication system may involve a network function consuming a service exposed by another network function. The provision of a service by a network function may be dependent on that network function being provided with a valid authorisation token.

SUMMARY

A method comprising: sending to a proxy function from a client function a first service request for which the client function delegates to the proxy function discovery, via a network repository function, of a service producer for the first service request; receiving at the client function in reply to the service request a service response, wherein the service response includes an authorisation token indicating a token scope; and in response to a determination that the indicated token scope at least partly matches a requested scope for a second service request regardless of whether the token scope fully matches the requested scope, including the authorisation token in the second service request.

The determination may comprise a determination that the indicated token scope and the requested scope match at one or more levels regardless of whether the requested scope and the indicated token scope match at one or more other levels.

The determination may comprise a determination that the indicated token scope and the requested scope match at a service name level, regardless of whether the indicated token scope and requested scope match at a resources and/or operations level.

The requested scope may specify one or more resources and/or operations, and the determination may comprise a determination that the indicated token scope and the requested scope match at a service name level, regardless of whether the indicated token scope also indicates the resources and/or operations.

The method may further comprise using at the client function one or more services for operation of a mobile communication system based on at least the service response.

A method, comprising: receiving at a proxy function from a client function a first service request for which the client function delegates to the proxy function discovery, via a network repository function, of a service producer for the first service request; sending a service response to the client function in reply to the first service request, wherein the service response includes an authorisation token used for acquiring the service response, wherein the authorisation token indicates a token scope; receiving a second service request from the client function wherein the service request includes the authorisation token, and specifies a requested scope partly matching the indicated token scope; and determining from information about the service producer received from the network repository function whether the authorisation token is usable for acquiring a service response to the second service request.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The method may further comprise: in the event that a result of the determining indicates that the authorisation token is not usable for acquiring a service response to the second service request, requesting from the network repository function another authorisation token for the requested scope, and using the another authorisation token for acquiring a service response to the second service request.

The information about the service producer may comprise information about authorisation requirements for the servicer producer.

The information about authorisation requirements for the servicer producer may comprise information about authorisation token scopes required by the service producer.

The service producer may provide one or more services for operation of a mobile communication system.

The method may further comprise: in the event of receiving another service request without an access token and specifying a list of requested scopes, performing: sending to the network repository function a request for an authorisation token specifying an intersection of the list of requested scopes and a set of authorisation token scopes for the service producer; receiving an authorisation token from the network repository function; and sending the service request and the authorisation token to the service producer.

A method, comprising: receiving at a proxy function from a client function a first service request for which the client function delegates to the proxy function discovery of a service producer for the first service request; and sending from the proxy function to the client function a service response in reply to the first service request, wherein the service response includes (i) an authorisation token used to acquire the service response, wherein the authorisation token indicates a token scope; and (ii) information about authorisation requirements for the service producer.

The information about authorisation requirements for the service producer may comprise information about authorisation token scopes required by the service producer.

The information about authorisation requirements for the service producer may assist a determination at the client function about whether the authorisation token is also usable for a second service request specifying a requested scope only partly matching the indicated token scope.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The service producer may provide one or more services for operation of a mobile communication system.

The method may further comprise: in the event of receiving another service request without an access token and specifying a list of requested scopes, performing: sending to a network repository function a request for an authorisation token specifying an intersection of the list of requested scopes and a set of authorisation token scopes for the service producer; receiving an authorisation token from the network repository function; and sending the service request and the authorisation token to the service producer.

A method, comprising: sending to a proxy function from a client function a first service request for which the client function delegates to the proxy function discovery of a service producer for the first service request; receiving at the client function from the proxy function a service response in reply to the first service request, wherein the service response includes (i) an authorisation token used to acquire the service response, wherein the authorisation token indicates a token scope and (ii) information about authorisation requirements for the service producer; sending to the proxy function from the client function a second service request specifying a requested scope only partly matching the indicated token scope; and determining whether to include the authorisation token in the second service request based at least partly on the information about authorisation requirements for the service producer.

The method may further comprise: based on a result of the determining, including the authorisation token in the second service request.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The method may further comprise using at the client function one or more services for operation of a mobile communication system based on at least the service response.

Apparatus comprising: means for sending to a proxy function from a client function a first service request for which the client function delegates to the proxy function discovery, via a network repository function, of a service producer for the first service request; means for receiving at the client function in reply to the service request a service response, wherein the service response includes an authorisation token indicating a token scope; and means for, in response to a determination that the indicated token scope at least partly matches a requested scope for a second service request regardless of whether the token scope fully matches the requested scope, including the authorisation token in the second service request.

The determination may comprise a determination that the indicated token scope and the requested scope match at one or more levels regardless of whether the requested scope and the indicated token scope match at one or more other levels.

The determination may comprise a determination that the indicated token scope and the requested scope match at a service name level, regardless of whether the indicated token scope and requested scope match at a resources and/or operations level.

The requested scope may specify one or more resources and/or operations, and the determination may comprise a determination that the indicated token scope and the requested scope match at a service name level, regardless of whether the indicated token scope also indicates the resources and/or operations.

The apparatus may further comprise means for using at the client function one or more services for operation of a mobile communication system based on at least the service response.

Apparatus, comprising: means for receiving at a proxy function from a client function a first service request for which the client function delegates to the proxy function discovery, via a network repository function, of a service producer for the first service request; means for sending a service response to the client function in reply to the first service request, wherein the service response includes an authorisation token used for acquiring the service response, wherein the authorisation token indicates a token scope; means for receiving a second service request from the client function wherein the service request includes the authorisation token, and specifies a requested scope partly matching the indicated token scope; and means for determining from information about the service producer received from the network repository function whether the authorisation token is usable for acquiring a service response to the second service request.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The apparatus may further comprise: means for, in the event that a result of the determining indicates that the authorisation token is not usable for acquiring a service response to the second service request, requesting from the network repository function another authorisation token for the requested scope, and using the another authorisation token for acquiring a service response to the second service request.

The information about the service producer may comprise information about authorisation requirements for the servicer producer.

The information about authorisation requirements for the servicer producer may comprise information about authorisation token scopes required by the service producer.

The service producer may provide one or more services for operation of a mobile communication system.

The apparatus may further comprise: means for, in the event of receiving another service request without an access token and specifying a list of requested scopes, performing: sending to the network repository function a request for an authorisation token specifying an intersection of the list of requested scopes and a set of authorisation token scopes for the service producer; receiving an authorisation token from the network repository function; and sending the service request and the authorisation token to the service producer.

Apparatus, comprising: means for receiving at a proxy function from a client function a first service request for which the client function delegates to the proxy function discovery of a service producer for the first service request; and means for sending from the proxy function to the client function a service response in reply to the first service request, wherein the service response includes (i) an authorisation token used to acquire the service response, wherein the authorisation token indicates a token scope; and (ii) information about authorisation requirements for the service producer.

The information about authorisation requirements for the service producer may comprise information about authorisation token scopes required by the service producer.

The information about authorisation requirements for the service producer may assist a determination at the client function about whether the authorisation token is also usable for a second service request specifying a requested scope only partly matching the indicated token scope.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The service producer may provide one or more services for operation of a mobile communication system.

The apparatus may further comprise: means for, in the event of receiving another service request without an access token and specifying a list of requested scopes, performing: sending to a network repository function a request for an authorisation token specifying an intersection of the list of requested scopes and a set of authorisation token scopes for the service producer; receiving an authorisation token from the network repository function; and sending the service request and the authorisation token to the service producer.

Apparatus, comprising: means for sending to a proxy function from a client function a first service request for which the client function delegates to the proxy function discovery of a service producer for the first service request; means for receiving at the client function from the proxy function a service response in reply to the first service request, wherein the service response includes (i) an authorisation token used to acquire the service response, wherein the authorisation token indicates a token scope and (ii) information about authorisation requirements for the service producer; means for sending to the proxy function from the client function a second service request specifying a requested scope only partly matching the indicated token scope; and means for determining whether to include the authorisation token in the second service request based at least partly on the information about authorisation requirements for the service producer.

The apparatus may further comprise: means for, based on a result of the determining, including the authorisation token in the second service request.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The apparatus may further comprise: means for using at the client function one or more services for operation of a mobile communication system based on at least the service response.

Apparatus comprising: at least one processor; and at least one memory including computer program code, the at least one memory and computer program code configured to, with the at least one processor, cause the apparatus to perform: sending to a proxy function from a client function a first service request for which the client function delegates to the proxy function discovery, via a network repository function, of a service producer for the first service request; receiving at the client function in reply to the service request a service response, wherein the service response includes an authorisation token indicating a token scope; and in response to a determination that the indicated token scope at least partly matches a requested scope for a second service request regardless of whether the token scope fully matches the requested scope, including the authorisation token in the second service request.

The determination may comprise a determination that the indicated token scope and the requested scope match at one or more levels regardless of whether the requested scope and the indicated token scope match at one or more other levels.

The determination may comprise a determination that the indicated token scope and the requested scope match at a service name level, regardless of whether the indicated token scope and requested scope match at a resources and/or operations level.

The requested scope may specify one or more resources and/or operations, and the determination may comprise a determination that the indicated token scope and the requested scope match at a service name level, regardless of whether the indicated token scope also indicates the resources and/or operations.

The at least one memory and computer program code may be configured to, with the at least one processor, cause the user equipment to: use at the client function one or more services for operation of a mobile communication system based on at least the service response.

Apparatus comprising: at least one processor; and at least one memory including computer program code, the at least one memory and computer program code configured to, with the at least one processor, cause the apparatus to perform: receiving at a proxy function from a client function a first service request for which the client function delegates to the proxy function discovery, via a network repository function, of a service producer for the first service request; sending a service response to the client function in reply to the first service request, wherein the service response includes an authorisation token used for acquiring the service response, wherein the authorisation token indicates a token scope; receiving a second service request from the client function wherein the service request includes the authorisation token, and specifies a requested scope partly matching the indicated token scope; and determining from information about the service producer received from the network repository function whether the authorisation token is usable for acquiring a service response to the second service request.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The at least one memory and computer program code may be configured to, with the at least one processor, cause the user equipment to: in the event that a result of the determining indicates that the authorisation token is not usable for acquiring a service response to the second service request, request from the network repository function another authorisation token for the requested scope, and use the another authorisation token for acquiring a service response to the second service request.

The information about the service producer may comprise information about authorisation requirements for the servicer producer.

The information about authorisation requirements for the servicer producer may comprise information about authorisation token scopes required by the service producer.

The service producer may provide one or more services for operation of a mobile communication system.

The at least one memory and computer program code may be configured to, with the at least one processor, cause the user equipment to: in the event of receiving another service request without an access token and specifying a list of requested scopes, perform: sending to the network repository function a request for an authorisation token specifying an intersection of the list of requested scopes and a set of authorisation token scopes for the service producer; receiving an authorisation token from the network repository function; and sending the service request and the authorisation token to the service producer.

Apparatus comprising: at least one processor; and at least one memory including computer program code, the at least one memory and computer program code configured to, with the at least one processor, cause the apparatus to perform: receiving at a proxy function from a client function a first service request for which the client function delegates to the proxy function discovery of a service producer for the first service request; and sending from the proxy function to the client function a service response in reply to the first service request, wherein the service response includes (i) an authorisation token used to acquire the service response, wherein the authorisation token indicates a token scope; and (ii) information about authorisation requirements for the service producer.

The information about authorisation requirements for the service producer may comprises information about authorisation token scopes required by the service producer.

The information about authorisation requirements for the service producer may assist a determination at the client function about whether the authorisation token is also usable for a second service request specifying a requested scope only partly matching the indicated token scope.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The service producer may provide one or more services for operation of a mobile communication system.

The at least one memory and computer program code may be configured to, with the at least one processor, cause the user equipment to: in the event of receiving another service request without an access token and specifying a list of requested scopes, perform: sending to a network repository function a request for an authorisation token specifying an intersection of the list of requested scopes and a set of authorisation token scopes for the service producer; receiving an authorisation token from the network repository function; and sending the service request and the authorisation token to the service producer.

Apparatus comprising: at least one processor; and at least one memory including computer program code, the at least one memory and computer program code configured to, with the at least one processor, cause the apparatus to perform: sending to a proxy function from a client function a first service request for which the client function delegates to the proxy function discovery of a service producer for the first service request; receiving at the client function from the proxy function a service response in reply to the first service request, wherein the service response includes (i) an authorisation token used to acquire the service response, wherein the authorisation token indicates a token scope and (ii) information about authorisation requirements for the service producer; sending to the proxy function from the client function a second service request specifying a requested scope only partly matching the indicated token scope; and determining whether to include the authorisation token in the second service request based at least partly on the information about authorisation requirements for the service producer.

The at least one memory and computer program code may be configured to, with the at least one processor, cause the user equipment to: based on a result of the determining, include the authorisation token in the second service request.

The indicated token scope and the requested scope may match at one or more levels without matching at one or more other levels.

The indicated token scope and the requested scope may match at a service name level, without matching at a resources and/or operations level.

The requested scope may specify one or more resources and/or operations, and the indicated token scope may not indicate any resources and/or operations.

The at least one memory and computer program code may be configured to, with the at least one processor, cause the user equipment to: use at the client function one or more services for operation of a mobile communication system based on at least the service response.

Apparatus comprising: sending circuitry for sending to a proxy function from a client function a first service request for which the client function delegates to the proxy function discovery, via a network repository function, of a service producer for the first service request; receiving circuitry for receiving at the client function in reply to the service request a service response, wherein the service response includes an authorisation token indicating a token scope; and including circuitry for, in response to a determination that the indicated token scope at least partly matches a requested scope for a second service request regardless of whether the token scope fully matches the requested scope, including the authorisation token in the second service request.

Apparatus, comprising: receiving circuitry for receiving at a proxy function from a client function a first service request for which the client function delegates to the proxy function discovery, via a network repository function, of a service producer for the first service request; sending circuitry for sending a service response to the client function in reply to the first service request, wherein the service response includes an authorisation token used for acquiring the service response, wherein the authorisation token indicates a token scope; receiving circuitry for receiving a second service request from the client function wherein the service request includes the authorisation token, and specifies a requested scope partly matching the indicated token scope; and determining circuitry for determining from information about the service producer received from the network repository function whether the authorisation token is usable for acquiring a service response to the second service request.

Apparatus, comprising: receiving circuitry for receiving at a proxy function from a client function a first service request for which the client function delegates to the proxy function discovery of a service producer for the first service request; and sending circuitry for sending from the proxy function to the client function a service response in reply to the first service request, wherein the service response includes (i) an authorisation token used to acquire the service response, wherein the authorisation token indicates a token scope; and (ii) information about authorisation requirements for the service producer.

Apparatus, comprising: sending circuitry for sending to a proxy function from a client function a first service request for which the client function delegates to the proxy function discovery of a service producer for the first service request; receiving circuitry for receiving at the client function from the proxy function a service response in reply to the first service request, wherein the service response includes (i) an authorisation token used to acquire the service response, wherein the authorisation token indicates a token scope and (ii) information about authorisation requirements for the service producer; sending circuitry for sending to the proxy function from the client function a second service request specifying a requested scope only partly matching the indicated token scope; and determining circuitry for determining whether to include the authorisation token in the second service request based at least partly on the information about authorisation requirements for the service producer.

A computer readable medium comprising program instructions stored thereon for performing: sending to a proxy function from a client function a first service request for which the client function delegates to the proxy function discovery, via a network repository function, of a service producer for the first service request; receiving at the client function in reply to the service request a service response, wherein the service response includes an authorisation token indicating a token scope; and in response to a determination that the indicated token scope at least partly matches a requested scope for a second service request regardless of whether the token scope fully matches the requested scope, including the authorisation token in the second service request.

A computer readable medium comprising program instructions stored thereon for performing: receiving at a proxy function from a client function a first service request for which the client function delegates to the proxy function discovery, via a network repository function, of a service producer for the first service request; sending a service response to the client function in reply to the first service request, wherein the service response includes an authorisation token used for acquiring the service response, wherein the authorisation token indicates a token scope; receiving a second service request from the client function wherein the service request includes the authorisation token, and specifies a requested scope partly matching the indicated token scope; and determining from information about the service producer received from the network repository function whether the authorisation token is usable for acquiring a service response to the second service request.

tion whether the authorisation token is usable for acquiring a service response to the second service request.

A computer readable medium comprising program instructions stored thereon for performing: receiving at a proxy function from a client function a first service request for which the client function delegates to the proxy function discovery of a service producer for the first service request; and sending from the proxy function to the client function a service response in reply to the first service request, wherein the service response includes (i) an authorisation token used to acquire the service response, wherein the authorisation token indicates a token scope; and (ii) information about authorisation requirements for the service producer.

A computer readable medium comprising program instructions stored thereon for performing: sending to a proxy function from a client function a first service request for which the client function delegates to the proxy function discovery of a service producer for the first service request; receiving at the client function from the proxy function a service response in reply to the first service request, wherein the service response includes (i) an authorisation token used to acquire the service response, wherein the authorisation token indicates a token scope and (ii) information about authorisation requirements for the service producer; sending to the proxy function from the client function a second service request specifying a requested scope only partly matching the indicated token scope; and determining whether to include the authorisation token in the second service request based at least partly on the information about authorisation requirements for the service producer.

A non-transitory computer readable medium comprising program instructions stored thereon for performing: sending to a proxy function from a client function a first service request for which the client function delegates to the proxy function discovery, via a network repository function, of a service producer for the first service request; receiving at the client function in reply to the service request a service response, wherein the service response includes an authorisation token indicating a token scope; and in response to a determination that the indicated token scope at least partly matches a requested scope for a second service request regardless of whether the token scope fully matches the requested scope, including the authorisation token in the second service request.

A non-transitory computer readable medium comprising program instructions stored thereon for performing: receiving at a proxy function from a client function a first service request for which the client function delegates to the proxy function discovery, via a network repository function, of a service producer for the first service request; sending a service response to the client function in reply to the first service request, wherein the service response includes an authorisation token used for acquiring the service response, wherein the authorisation token indicates a token scope; receiving a second service request from the client function wherein the service request includes the authorisation token, and specifies a requested scope partly matching the indicated token scope; and determining from information about the service producer received from the network repository function whether the authorisation token is usable for acquiring a service response to the second service request.

A non-transitory computer readable medium comprising program instructions stored thereon for performing: receiving at a proxy function from a client function a first service request for which the client function delegates to the proxy function discovery of a service producer for the first service request; and sending from the proxy function to the client function a service response in reply to the first service request, wherein the service response includes (i) an authorisation token used to acquire the service response, wherein the authorisation token indicates a token scope; and (ii) information about authorisation requirements for the service producer.

A non-transitory computer readable medium comprising program instructions stored thereon for performing: sending to a proxy function from a client function a first service request for which the client function delegates to the proxy function discovery of a service producer for the first service request; receiving at the client function from the proxy function a service response in reply to the first service request, wherein the service response includes (i) an authorisation token used to acquire the service response, wherein the authorisation token indicates a token scope and (ii) information about authorisation requirements for the service producer; sending to the proxy function from the client function a second service request specifying a requested scope only partly matching the indicated token scope; and determining whether to include the authorisation token in the second service request based at least partly on the information about authorisation requirements for the service producer.

A computer program comprising computer executable code which when run on at least one processor is configured to cause a user equipment at least to: send to a proxy function from a client function a first service request for which the client function delegates to the proxy function discovery, via a network repository function, of a service producer for the first service request; receive at the client function in reply to the service request a service response, wherein the service response includes an authorisation token indicating a token scope; and in response to a determination that the indicated token scope at least partly matches a requested scope for a second service request regardless of whether the token scope fully matches the requested scope, include the authorisation token in the second service request.

A computer program comprising computer executable code which when run on at least one processor is configured to cause a user equipment at least to: receive at a proxy function from a client function a first service request for which the client function delegates to the proxy function discovery, via a network repository function, of a service producer for the first service request; send a service response to the client function in reply to the first service request, wherein the service response includes an authorisation token used for acquiring the service response, wherein the authorisation token indicates a token scope; receive a second service request from the client function wherein the service request includes the authorisation token, and specifies a requested scope partly matching the indicated token scope; and determine from information about the service producer received from the network repository function whether the authorisation token is usable for acquiring a service response to the second service request.

A computer program comprising computer executable code which when run on at least one processor is configured to cause a user equipment at least to: receive at a proxy function from a client function a first service request for which the client function delegates to the proxy function discovery of a service producer for the first service request; and send from the proxy function to the client function a service response in reply to the first service request, wherein the service response includes (i) an authorisation token used to acquire the service response, wherein the authorisation token indicates a token scope; and (ii) information about authorisation requirements for the service producer.

A computer program comprising computer executable code which when run on at least one processor is configured to cause a user equipment at least to: send to a proxy function from a client function a first service request for which the client function delegates to the proxy function discovery of a service producer for the first service request; receive at the client function from the proxy function a service response in reply to the first service request, wherein the service response includes (i) an authorisation token used to acquire the service response, wherein the authorisation token indicates a token scope and (ii) information about authorisation requirements for the service producer; send to the proxy function from the client function a second service request specifying a requested scope only partly matching the indicated token scope; and determine whether to include the authorisation token in the second service request based at least partly on the information about authorisation requirements for the service producer.

A method, comprising: retrieving from a network repository function profile information for a service producer function, including a set of authorisation token scopes for the service producer function, for a service request specifying a list of requested scopes; based on the profile information, sending to the network repository function a request for an authorisation token specifying an intersection of the list of requested scopes and the set of authorisation token scopes for the service producer function; receiving an authorisation token form the network repository function; and sending the service request and the authorisation token to the service producer function.

The service producer function may provide one or more services for operation of a mobile communication system.

A method, comprising: receiving at a network repository function a request for an authorisation token, wherein the request for an authorisation token specifies a list of requested scopes; based on profile information for a service producer function, including a set of authorisation token scopes for the service producer function, sending, in reply to the request for an authorisation token, an authorisation token specifying an intersection of the list of requested scopes and the set of authorisation token scopes from the profile information for the service producer function.

The service producer function may provide one or more services for operation of a mobile communication system.

A method, comprising: retrieving from a network repository function profile information for a service producer function, including a set of authorisation token scopes for the service producer function, for a service request specifying a list of requested scopes; based on the profile information, sending to the network repository function a request for an authorisation token specifying an intersection of the list of requested scopes and the set of authorisation token scopes for the service producer function; receiving an authorisation token form the network repository function; and sending the service request and the authorisation token to the service producer function.

The service producer function may provide one or more services for operation of a mobile communication system.

Apparatus, comprising: means for receiving at a network repository function a request for an authorisation token, wherein the request for an authorisation token specifies a list of requested scopes; means for, based on profile information for a service producer function (including a set of authorisation token scopes for the service producer function), sending, in reply to the request for an authorisation token, an authorisation token specifying an intersection of the list of requested scopes and the set of authorisation token scopes from the profile information for the service producer function.

The service producer function may provide one or more services for operation of a mobile communication system.

Apparatus comprising: at least one processor; and at least one memory including computer program code, the at least one memory and computer program code configured to, with the at least one processor, cause the apparatus to perform: retrieving from a network repository function profile information for a service producer function, including a set of authorisation token scopes for the service producer function, for a service request specifying a list of requested scopes; based on the profile information, sending to the network repository function a request for an authorisation token specifying an intersection of the list of requested scopes and the set of authorisation token scopes for the service producer function; receiving an authorisation token form the network repository function; and sending the service request and the authorisation token to the service producer function.

The service producer function may provide one or more services for operation of a mobile communication system.

Apparatus comprising: at least one processor; and at least one memory including computer program code, the at least one memory and computer program code configured to, with the at least one processor, cause the apparatus to perform: receiving at a network repository function a request for an authorisation token, wherein the request for an authorisation token specifies a list of requested scopes; based on profile information for a service producer function, including a set of authorisation token scopes for the service producer function, sending, in reply to the request for an authorisation token, an authorisation token specifying an intersection of the list of requested scopes and the set of authorisation token scopes from the profile information for the service producer function.

The service producer function may provide one or more services for operation of a mobile communication system.

Apparatus comprising: retrieving circuitry for retrieving from a network repository function profile information for a service producer function, including a set of authorisation token scopes for the service producer function, for a service request specifying a list of requested scopes; sending circuitry for, based on the profile information, sending to the network repository function a request for an authorisation token specifying an intersection of the list of requested scopes and the set of authorisation token scopes for the service producer function; receiving circuitry for receiving an authorisation token form the network repository function; and sending circuitry for sending the service request and the authorisation token to the service producer function.

Apparatus comprising: receiving circuitry for receiving at a network repository function a request for an authorisation token, wherein the request for an authorisation token specifies a list of requested scopes; and sending circuitry for, based on profile information for a service producer function, including a set of authorisation token scopes for the service producer function, sending, in reply to the request for an authorisation token, an authorisation token specifying an intersection of the list of requested scopes and the set of authorisation token scopes from the profile information for the service producer function.

A computer readable medium comprising program instructions stored thereon for performing: retrieving from a network repository function profile information for a service producer function, including a set of authorisation token scopes for the service producer function, for a service request specifying a list of requested scopes; based on the profile information, sending to the network repository function a request for an authorisation token specifying an intersection of the list of requested scopes and the set of authorisation token scopes for the service producer function; receiving an authorisation token form the network repository function; and sending the service request and the authorisation token to the service producer function.

A computer readable medium comprising program instructions stored thereon for performing: receiving at a network repository function a request for an authorisation token, wherein the request for an authorisation token specifies a list of requested scopes; based on profile information for a service producer function, including a set of authorisation token scopes for the service producer function, sending, in reply to the request for an authorisation token, an authorisation token specifying an intersection of the list of requested scopes and the set of authorisation token scopes from the profile information for the service producer function.

A non-transitory computer readable medium comprising program instructions stored thereon for performing: retrieving from a network repository function profile information for a service producer function, including a set of authorisation token scopes for the service producer function, for a service request specifying a list of requested scopes; based on the profile information, sending to the network repository function a request for an authorisation token specifying an intersection of the list of requested scopes and the set of authorisation token scopes for the service producer function; receiving an authorisation token form the network repository function; and sending the service request and the authorisation token to the service producer function.

A non-transitory computer readable medium comprising program instructions stored thereon for performing: receiving at a network repository function a request for an authorisation token, wherein the request for an authorisation token specifies a list of requested scopes; based on profile information for a service producer function, including a set of authorisation token scopes for the service producer function, sending, in reply to the request for an authorisation token, an authorisation token specifying an intersection of the list of requested scopes and the set of authorisation token scopes from the profile information for the service producer function.

A computer program comprising computer executable code which when run on at least one processor is configured to cause a user equipment at least to: retrieve from a network repository function profile information for a service producer function, including a set of authorisation token scopes for the service producer function, for a service request specifying a list of requested scopes; based on the profile information, send to the network repository function a request for an authorisation token specifying an intersection of the list of requested scopes and the set of authorisation token scopes for the service producer function; receive an authorisation token form the network repository function; and send the service request and the authorisation token to the service producer function.

A computer program comprising computer executable code which when run on at least one processor is configured to cause a user equipment at least to: receive at a network repository function a request for an authorisation token, wherein the request for an authorisation token specifies a list of requested scopes; based on profile information for a service producer function, including a set of authorisation token scopes for the service producer function, send, in reply to the request for an authorisation token, an authorisation token specifying an intersection of the list of requested scopes and the set of authorisation token scopes from the profile information for the service producer function.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which:

FIG. 7 shows a representation of an example of operations of a service-requesting network function according to an example embodiment;

FIG. 8 shows a representation of an example of operations of a proxy function according to another example embodiment;

FIG. 9 shows a representation of an example of operations of a token-requesting network function according to yet another example embodiment;

FIG. 10 shows a representation of an example of operations of a network repository function according to yet another example embodiment;

DETAILED DESCRIPTION

By way of example, the following description focusses on the example of a mobile communications system core network (CN) operating according to 3GPP 5G technology, but the underlying technique may also be applicable to core networks operating according to other technologies, such as more evolved 3GPP technologies.

Figure 1:
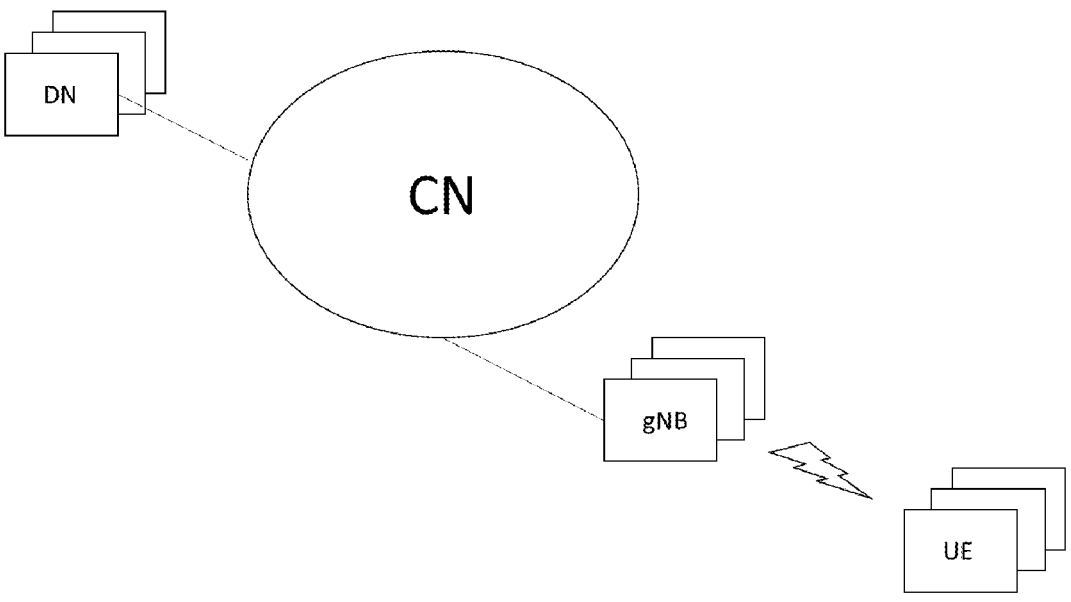
FIG. 1 shows an example mobile communication system to which embodiments may be applied.

FIG. 1 shows a simple representation of one example of a 3GPP 5G system architecture. All the units shown in FIG. 1 are logical units. The connections shown in FIG. 1 are logical connections; the actual physical connections may be different. A 5G system may comprise also other functions and structures than those shown in FIG. 1.

A core network (CN) may provide connections between devices implementing user equipment functionality (UEs) and one or more data networks (DN) via a radio access network comprising a network of devices implementing instances of gNB functionality.

An instance of gNB functionality may be implemented by a central unit (gNB-CU), a plurality of distributed units (gNB-DU) associated with the gNB-CU, and one or more radio units (gNB-RU) associated with each gNB-DU. A gNB-RU provides the digital front end (DFE), parts of the PHY layer functionality, and digital beamforming functionality. A gNB-DU provides Layer 1/2 (L1/2) functionality, including MAC (Medium Access Control) functionality, RLC (Radio Link Control) functionality, and part of the PHY layer functionality. A gNB-CU provides higher layer functionality including Layer 3 (L3) functionality—RRC (Radio Resource Control) functionality and PDCP (Packet Data Convergence Protocol) functionality.

Each gNB-CU is (i) connected to a user plane function (UPF) (not shown) of the core network (CN), for routing and forwarding user data packets and for providing connectivity of devices to one or more external packet data networks (DN), and (ii) is connected to an access mobility management function (AMF) (not shown) of the core network (CN) for controlling access and changes of serving cells for UEs.

The term "user equipment" (UE) may refer to any device, apparatus or component implementing at least 3GPP user equipment (UE) functionality.

The UE may be a mobile or static device (e.g. a portable or non-portable computing device) including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a UE device may also be a nearly exclusive uplink only device, of which an example is a camera or video camera loading images or video clips to a network. A UE device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a UE device may comprise a user portable device with radio parts (such as a watch, earphones or eyeglasses) and the computation is carried out in the cloud.

5G enables using multiple input—multiple output (MIMO) antennas, and may involve large numbers of base stations (gNB s) including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G may employ multiple radio interfaces, e.g. below 6 GHz or above 24 GHz, cmWave and mmWave, and may also be integrable with existing legacy radio access technologies, such as LTE. Integration with LTE may be implemented, as a system, where macro coverage is provided by LTE and 5G radio interface access comes from small cells by aggregation to the LTE. In other words, 5G may support both inter-RAT operability (such as LTE-5G) and inter-RI operability (inter-radio interface operability, such as below 6 GHz—cmWave, 6 or above 24 GHz—cmWave and mmWave). 5G networks may employ network slicing, in which multiple independent and dedicated virtual sub-networks (network instances) may be created within the same infrastructure to run services that have different requirements on latency, reliability, throughput and mobility.

Low latency applications and services may be facilitated by bringing content close to the 5G system, which leads to local break out and multi-access edge computing (MEC). 5G enables analytics and knowledge generation to occur at the source of the data. This approach may involve leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The 5GC adopts a service-based architecture (SBA) according to which communication between network functions uses Service Based Interfaces (SBIs). Application Programming Interfaces (APIs) are used for the SBIs.

The operation of a core network function may comprise the core network function consuming a service exposed by another core network function and/or exposing a service for consumption by other network functions. A network function requiring a service provided by another network function discovers an available and suitable instance of the other network function via a service discovery procedure using a network repository function (NRF), which provides a register of network function instances. Instances of network functions register the services they provide with the NRF; a network function requiring a service, for itself or on behalf of another network function, queries the NRF for a suitable instance of a network function exposing the required service, and in return receives an address for an instance of a network function exposing the required service.

A service exposed by a network function may be identified at the highest level by a service name, and may be further structured into service operations, as defined in 3GPP TS 29.501.

A network function may query the NRF directly or indirectly via a proxy function according to a delegated discovery technique. One example of a proxy function is a Service Communication Proxy (SCP). The SCP is responsible for discovering/selecting a network service producer function (NFp) for providing the requested service. As mentioned further below, the SCP is also responsible for requesting NRF for an access token on behalf of the service-requesting network function, also known as a network service consumer function (NFc).

Authorization for one network function to invoke a service exposed by another network function may involve requesting NRF (acting as Oauth2 authorization server) for an authorisation token. Once an authorisation token is acquired from NRF, the authorisation token is included in the service request towards the network function instance exposing the required service. The network function instance receiving the service request can validate the service request based on the authorisation token.

The authorisation token may, for example, be an access token of the kind described at clause 6.7.3 of 3GPP TS 29.500. The access token indicates an access scope. The access token may, for example, simply indicate the service name of the service exposed by the network function (NFp), without any indication of specific operations/resources. This access token grants generic access to a given API for those operations/resources that do not require a specific authorisation. Alternatively, the access token may indicate both (a) the service name, and (b) a string that uniquely represents a specific operation (e.g. create/modify/read) and/or resource for which a specific authorisation (i.e. more than a generic authorisation) is required.

The information registered at NRF by a service-providing network function (NFp) includes information about the scopes of access token the network function (NFp) expects to receive in order to validate a service request for a particular operation/resource. This information may take the form indicated at section 6.1.6.2.3 of 3GPP TS 29.510, which describes an example of attributes (per service) for a NF profile registered in NRF.

The profile information provided by NRF in a discovery response message, in reply to a discovery request message specifying a service by service name, also comprises information about the scopes of access token the network function (NFp) expects to receive in order to validate a service request for the allowed operations for the service identified by service name in the discovery request message. This profile information communicated by the Discovery Response message may take the form indicated at section 6.2.6.2.4 of 3GPP TS 29.510.

As mentioned above, delegated discovery involves the SCP requesting NRF for the necessary access token on behalf of the service-requesting network function (NFc).

Figure 3:
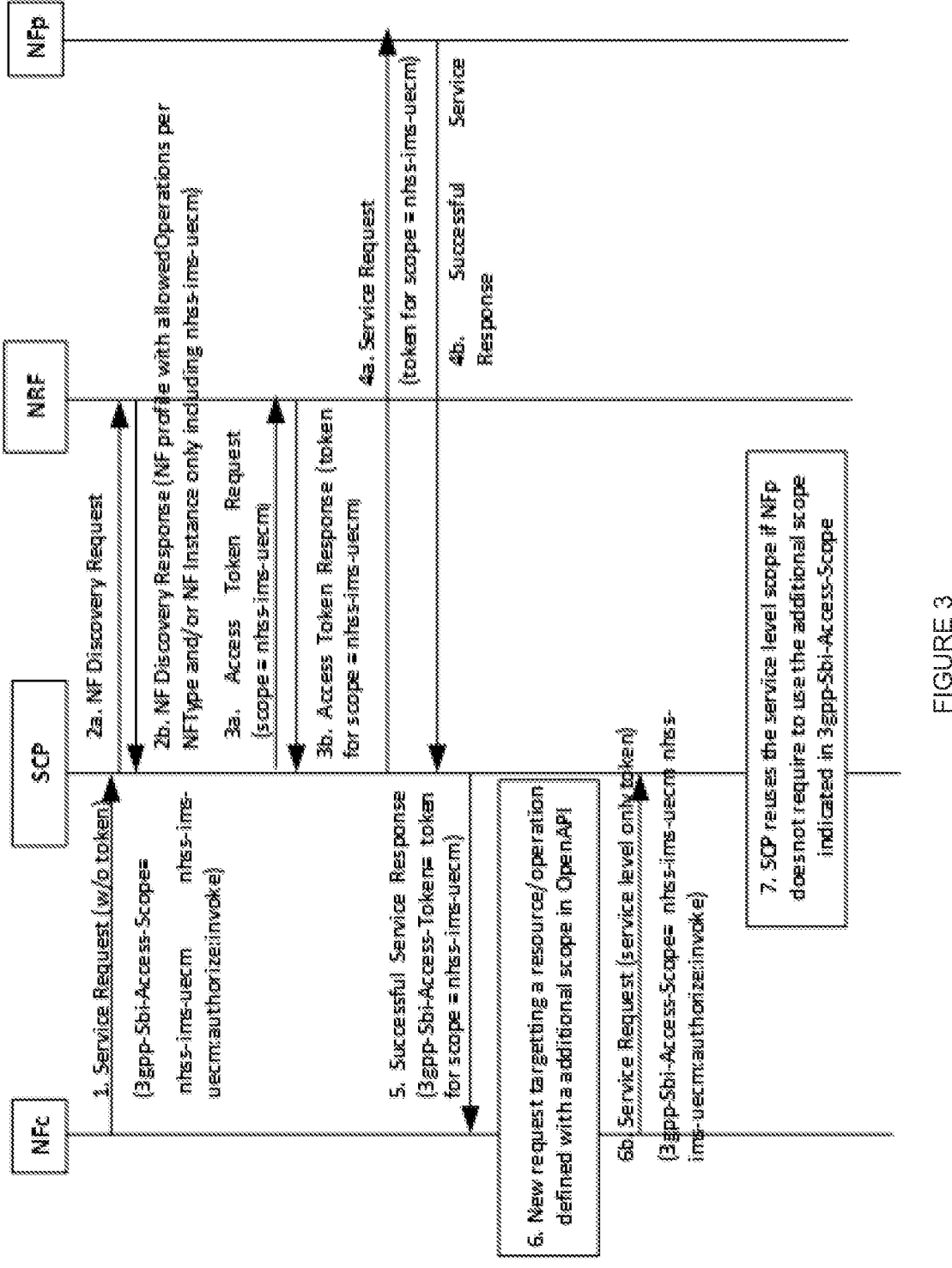
FIG. 3 shows a representation of an example of operations of the network functions of FIG. 2 according to an example embodiment.
Figure 4:
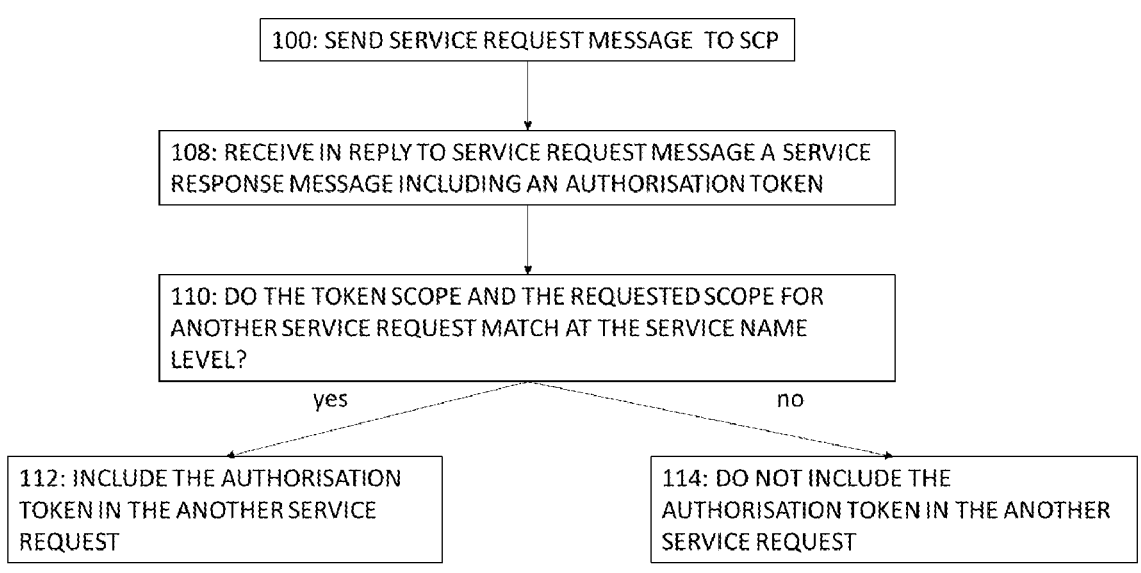
FIG. 4 shows a representation of an example of operations of a service-requesting network function according to an example embodiment.
Figure 5:
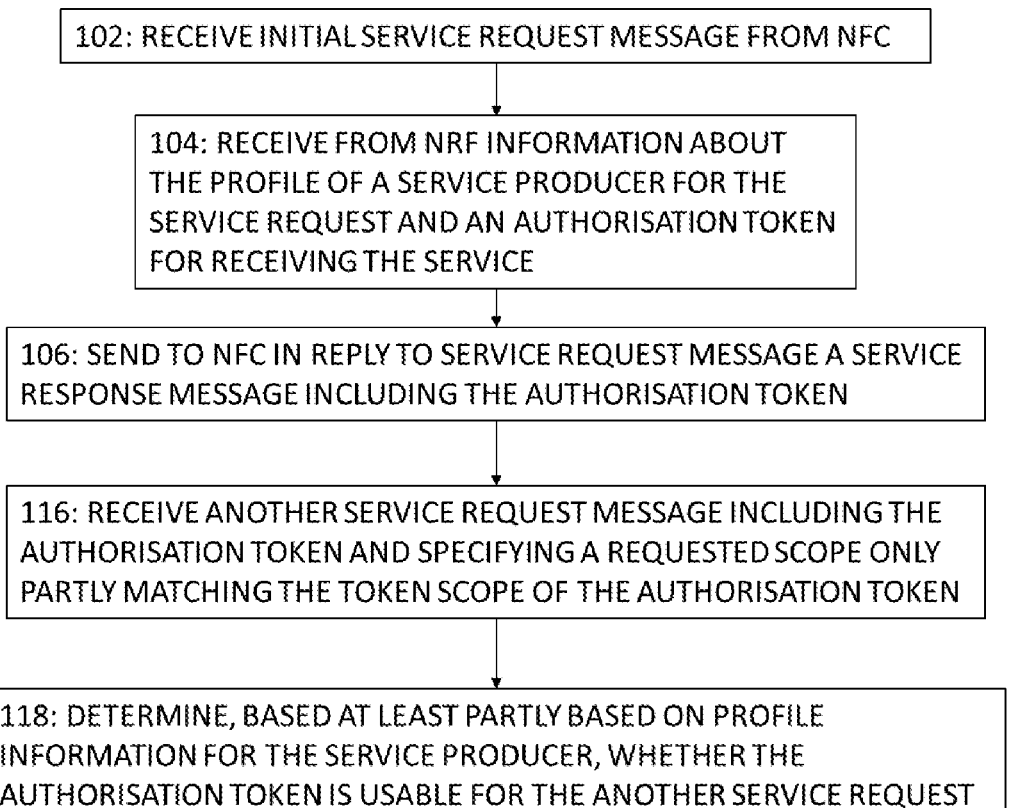
FIG. 5 shows a representation of an example of operations of a proxy function according to an example embodiment.

FIGS. 3 to 5 illustrate a representation of one example of operations according to an example embodiment.

A network function (NFc) requiring a service sends a service request message to a SCP function (Operation 1 of FIG. 3 and Operation 100 of FIG. 4) to which it delegates discovery via NRF of a suitable network function (NFp) instance for providing the requested service. The service request message specifies the scope of the requested service using a 3gpp-Sbi-Access-Scope header. This corresponds to the scope of the service request for the related resource and service operation, as defined by 3GPP in the corresponding API. In this example, this initial service request message does not include any access token.

SCP receives the service request message (Operation 102 of FIG. 5), and obtains from NRF (i) profile information for a service-providing network function NFp instance determined by NRF to be suitable for providing the service, and (ii) an access token for receiving the service from the service-providing network function NFp instance (Operation 104 of FIG. 5).

In more detail, SCP sends a NF discovery request to NRF based on the service request message received from NFc (Step 2a of FIG. 3). The discovery request message may indicate the service name indicated in the service request message received from NFc.

SCP receives a NF discovery response message from NRF (Step 2b of FIG. 3). The discovery response message includes profile information for a suitable network function instance exposing the requested service. The profile information includes the above-mentioned information about the scopes of access token the service-providing network function (NFp) instance expects to receive in order to validate a service request for the allowed operations for the service identified in the discovery request message, or more generally, for each of the different services NFp provides that are included in the discovery response message.

SCP acquires the necessary access token from NRF (Steps 3a and 3b of FIG. 3).

SCP sends a Service Request message to the service-providing function (NFp) instance identified in the Discovery Response message (Step 4a of FIG. 5). The receiving NFp instance validates the service request based on the access token, and sends a service response message to SCP (Operation 4b of FIG. 5).

SCP forwards the service response to the service-requesting network function NFc, together with the access token used to successfully acquire the service (Operation 5 of FIG. 5 and Operation 106 of FIG. 5).

In this example, the access token is a generic access token. In the event that, during the validity period of the access token, network function NFc requires the same service for a specific resource/operation, NFc includes the generic access token in the new service request message, on the basis that the access token matches the new requested service scope at the service name level (regardless of the fact that the access token does not indicate the specific resource/operation that is the subject of the new service request).

NFc sends the new service request message (including the generic access token) to SCP (Operation 6b of FIG. 5, Operation 112 of FIG. 4 and Operation 116 of FIG. 5).

Based on the profile information retrieved from NRF for the service-providing network function NFp instance, SCP determines whether the generic access token can be used for the specific operation/resources identified in the new service request message from NFc (Operation 118 of FIG. 5). If SCP determines that the specific operation/resources identified in the new service request message do not require specific authorisation beyond the generic authorisation provided by the generic access token, SCP sends a service request to the service-providing network function NFp instance, including the generic access token included in the new service request message from NFc (Operation 7 of FIG. 3). On the other hand, if the profile information for NFp instance indicates that the specific operation/resources identified in the new service request message from NFc do require specific authorisation and a new access token with an additional scope beyond the service-level scope, SCP requests NRF for a new access token indicating the additional scope.

On the other hand, if NFc determines that it does not have any non-expired access token indicating the same service name as the new service request message, it does not include any access token in the new service request message to SCP (Operation 114 of FIG. 4); and SCP requests NRF for an access token to receive the service identified in the new service request message from NFc for the operation/resources identified in the new service request message from NFc.

Figure 6:
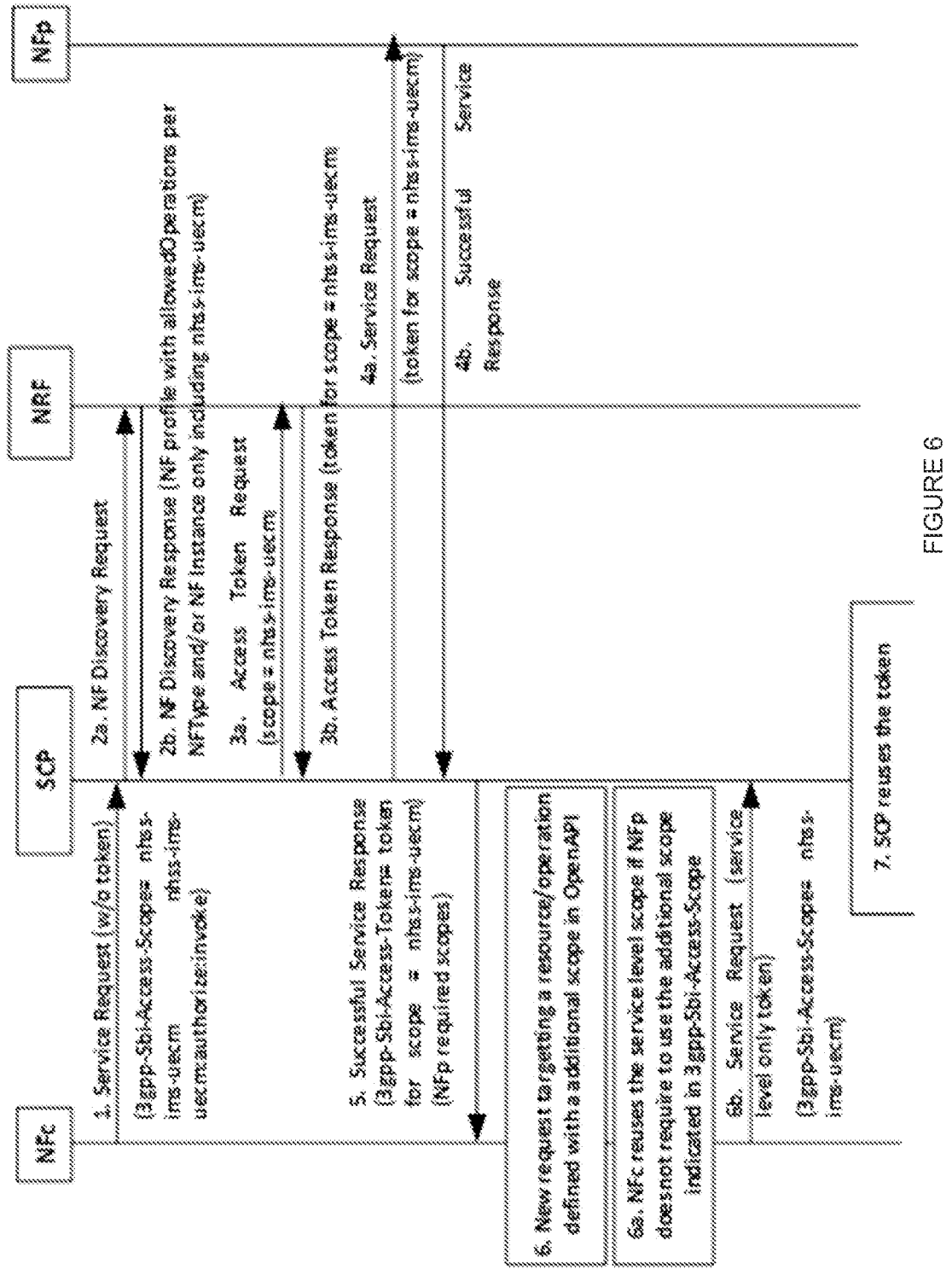
FIG. 6 shows a representation of an example of operations of the functions of FIG. 2 according to another example embodiment.

FIGS. 6 to 8 show a representation of operations at core network functions according to another example embodiment.

Operations 1 to 4b of FIG. 6 are the same as operations 1 to 4b of FIG. 3.

In reply to receiving an initial service request message from NFc (Operation 200 of FIG. 8 and Operation 202 of FIG. 7), SCP performs the procedures necessary to receive the requested service from a service-providing network function NFp, and forwards the successful service response to NFc together with (i) the access token used to successfully acquire the service response, and (ii) profile information for the service-providing network function NFp instance. This profile information sent to NFc includes information about specific operations/resources that require specific authorisation (access token with additional scope) beyond generic authorisation (generic access token) (Operation 5 of FIG. 6, Operation 206 of FIG. 8 and Operation 204 of FIG. 7). Alternatively, this profile information sent to NFc includes information about all authorisations expected by NFp, including access tokens with additional scope and generic access tokens.

In this example, the access token used to successfully acquire the service response and forwarded from SCP to NFc is again a generic access token. In the event that, during the validity period of the generic access token, network function NFc requires the same service for a specific resource/operation, NFc determines, based on the NFp profile information received together with the service response at operation 5 of FIG. 6, whether the generic access token can be used for the specific operation/resource that is to be the specific subject of the new service request message (OPERATION 208 of FIG. 5). If NFc determines that the specific operation/resources that are to be the subject of the new service request message do not require specific authorisation beyond the generic authorisation provided by the generic access token, NFc includes the previously received generic access token in the new service request message to SCP (Operation 6b of FIG. 6 and OPERATION 210 of FIG. 8). SCP may be configured to, in response to receiving from NFc a service request message including an access token, directly send a service request message (including the access token received from NFc) to the service-providing function NFp instance (i.e. without checking the usability of the access token, or requesting NRF for a new access token) (Operation 7 of FIG. 6).

On the other hand, if the profile information for NFp instance indicates that the specific operation/resources identified in the new service request message from NFc do require specific authorisation and a new access token with an additional scope beyond the service-level scope, NFc sends the new service request message to SCP without the previously received access token (or any access token) (OPERATION 212 of FIG. 8); and SCP requests NRF for an access token of the necessary scope for receiving the service for the specific operation/resources identified in the new service request message received from NFc.

FIG. 9 shows a representation of an example of operations at SCP according to another example embodiment.

In response to receiving from NFc a service request message without any access token and specifying a list of requested scopes (OPERATION 300): SCP retrieves, from NRF, profile information for a network function instance exposing the requested service, wherein the profile information indicates the full set of expected token scopes for the service-producing network function NFp instance for the service specified in the service request message (OPERATION 302 of FIG. 9). SCP sends to NRF a request for an access token specifying the intersection between the list of requested scopes specified in the service request message from NFc and the above-mentioned full set of expected token scopes for NFp instance for the service (OPERATION 304 of FIG. 9). In other words, SCP requests an access token that provides authorisation for any scope that is listed in the service request message from NFc, and for which a generic authorisation and/or a specific authorisation is required by NFp instance.

This technique may, for example, be used in combination with the technique illustrated by FIGS. 3 to 5, or in combination with the technique illustrated by FIGS. 6 to 8.

FIG. 10 shows a representation of an example of operations at NRF according to another example embodiment.

In response to receiving an access token request message specifying a list of requested scopes (OPERATION 400 of FIG. 10), NRF sends to SCP an access token specifying the intersection between the list of requested scopes specified in the access token request message from NFc and the full set of expected token scopes for NFp instance for the service indicated in the access token request message (OPERATION 402 of FIG. 10). In other words, NRF provides an access token that provides authorisation for any scope that is listed in the access token request message from SCP, and for which a generic authorisation and/or a specific authorisation is required by NFp instance.

This technique may, for example, be used in combination with the technique illustrated by FIGS. 3 to 5, or in combination with the technique illustrated by FIGS. 6 to 8.

One or more of the above-described techniques can enable the reuse by SCP of earlier granted tokens for service requests defined with an additional scope in OpenAPI when NFp is not configured to require an additional scope from NFc Type or NfInstance ID.

The above-described techniques can reduce the number of unnecessary requests that SCP makes to NRF for access tokens.

The above-described techniques can also reduce the risk of SCP sending to the service-providing function NFp access tokens that would be rejected by NFp.

Figure 2:
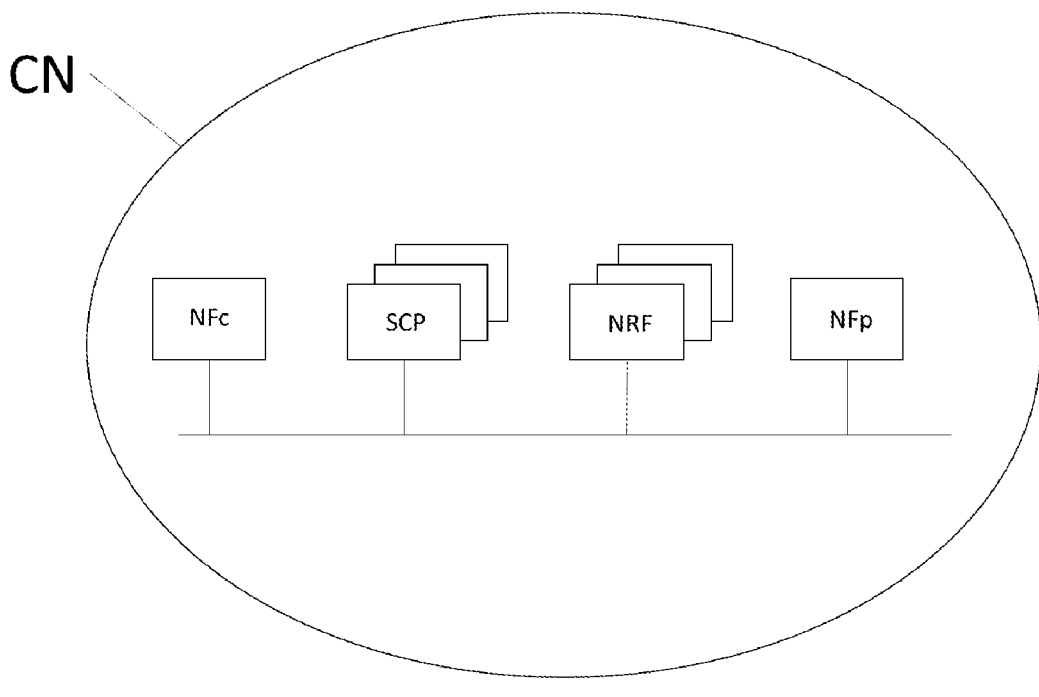
FIG. 2 shows a representation of an example of some network functions of the core network of FIG. 1.
Figure 11:
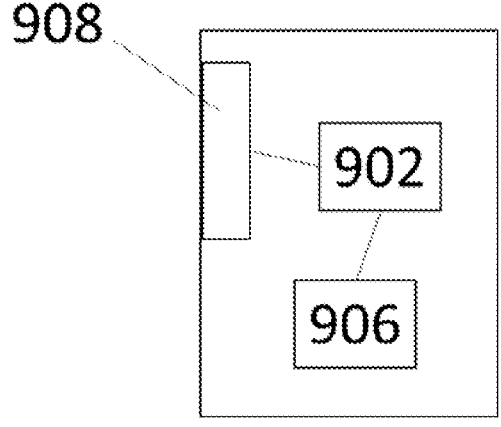
FIG. 11 shows a representation of an example of apparatus for implementing any of the core network functions according to some example embodiments.

FIG. 11 illustrates an example of an apparatus for implementing any of the core network functions NFc, SCP, NRF and NFp in FIG. 2. The apparatus may include at least one processor 902 coupled to one or more interfaces 908 for communication with other network functions The at least one processor 902 may also be coupled to at least one memory 906. The at least one processor 902 may be configured to execute an appropriate software code to perform the operations described above. The software code may be stored in the memory 906.

Figure 12:
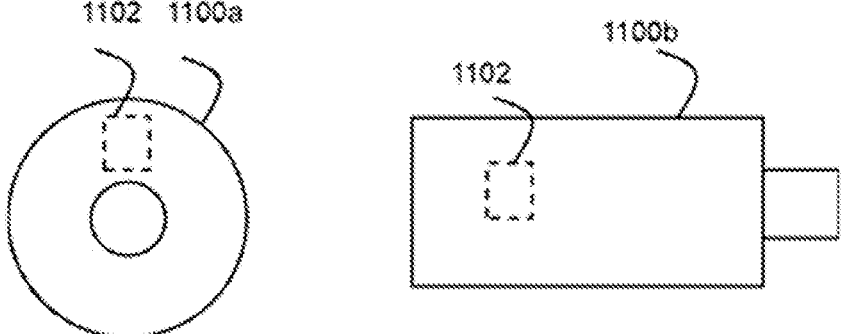
FIG. 12 shows a representation of an example of non-volatile memory media.

FIG. 12 shows a schematic representation of non-volatile memory media 1100*a* (e.g. computer disc (CD) or digital versatile disc (DVD)) and 1100*b* (e.g. universal serial bus (USB) memory stick) storing instructions and/or parameters 1102 which when executed by a processor allows the processor to perform one or more of the steps of the methods described previously.

It is to be noted that example embodiments may be implemented as circuitry, in software, hardware, application logic or a combination of software, hardware and application logic. In an example embodiment, the application logic, software or an instruction set is maintained on any computer-readable media. In the context of this document, a "computer-readable medium" may be any media or means that can contain, store, communicate, propagate or transport the instructions for use by or in connection with an instruction execution system, apparatus, or device, such as the base stations or user equipment of the above-described example embodiments.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as the user equipment or base stations of the above-described embodiments, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The features, advantages, and characteristics described herein can be combined in any suitable manner in one or more example embodiments. One skilled in the relevant art will recognize that such example embodiments can be practiced without one or more of the specific features or advantages of a particular embodiment. In other instances, additional features and advantages can be recognized in certain embodiments that may not be present in all example embodiments. One having ordinary skill in the art will readily understand that the example embodiments as discussed above may be practiced with steps in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus comprising:

at least one processor; and at least one memory including instructions of a network function service consumer for a mobile communication system, wherein the instructions, when executed by the at least one processor, cause the apparatus to perform operations, the operations comprising:

sending, to a service communication proxy (SCP) of the mobile communication system, a first service request for a service to which the network function service consumer delegates discovery of a network function service producer of the mobile communication system that exposes the service;

receiving, from the SCP in reply to the first service request, a first service response indicting acceptance of the first service request, wherein the service response includes an authorisation token used by the SCP to successfully acquire access to the service, the authorisation token indicating a token scope; and in an instance of requiring access to the service, based on determining that the token scope matches a scope of the service at a service name level;

including the authorisation token in a second service request for the service; and sending, to the SCP, the second service request including the authorization token.

2. The apparatus according to claim 1, wherein the determining that the token scope matches the scope for the service at the service level comprises determining a service name indicated in the token scope matches a service name indicated in the scope of the service.

3. The apparatus according to claim 1, wherein the including comprising including a resource or service operation for the service in the second service request.

4. An apparatus comprising:

at least one processor; and at least one memory including instructions of a service communication proxy (SCP) of a mobile communication system, wherein the instructions when executed by the at least one processor, cause the apparatus to perform operations, the operations comprising:

receiving from a network function service consumer, a first service request for a service;

sending, to a network repository function (NRF) of the mobile communication system, a discovery request to discover a network function service producer that exposes the service;

receiving, from the NRF, a discovery response comprising profile information for a network function service producer that exposes the service and an authorisation token to be used for acquiring access to the service;

sending to the network function service consumer in reply to the first service request, the discovery response that includes the authorisation token wherein the authorisation token indicates a token scope;

receiving, from the network function service consumer, a second service request for the service, the second service request comprising the authorisation token, and a scope of the service that matches the token scope at a service level; and determining, based on the profile information for the network function service producer and the scope of the service whether the authorisation token is usable for acquiring access to the service requested by the second service request; and based on determining that the authorization token is usable for acquiring access to the service, sending, to the network function service producer, the second service request comprising the authorization token.

5. The apparatus according to claim 4, wherein the scope indicates one or more resources for the service and wherein the token scope does not indicate any resources for the service.

6. The apparatus according to claim 4, wherein the scope indicates one or more service operations of the service and wherein the token scope does not indicate any service operations of the service.

7. The apparatus according to claim 6, wherein the scope indicates one or more resources for the service, and wherein the token scope does not indicate any resources for the service.

8. The apparatus according to claim 4, wherein the second service request comprises an additional scope indicating a resource for the service or a service operation of the service and wherein the operations further comprise:

determining that the authorisation token is not usable for acquiring access to the resource for the service or the service operation of the service;

based on the determining that the authorization token is not usable for acquiring access to the resource for the service or the service operation of the service, sending a request for another authorisation token for acquiring access to the resource for the service or the service operation of the service indicated in the additional scope of the service included in the second service request; and receiving, from the network repository function, the another authorization token;

replacing, in the second service request, the authorization token with the another authorisation token for acquiring access to the service; and sending, to the network function service producer, the second service request including the another authorisation token.

9. The apparatus according to claim 4, wherein the profile information for the network function service producer comprises information about authorisation requirements for authorizing access to the service exposed by the network function service producer.

10. The apparatus according to claim 9, wherein the information about authorisation requirements for authorizing access to the service exposed by the network function producer comprises information about token scopes required by the network function service producer.

11. The apparatus according to claim 4, wherein the operations further comprise:

receiving another service request a for the service, the another service request comprising a list of requested scopes for the service;

sending, to the network repository function, a request for another authorisation token specifying an intersection of the list of requested scopes for the service and a set of authorisation token scopes for the network function service producer;

receiving the another authorisation token from the network repository function; and sending, to the network function service producer, the another service request for the service, the another service request including the another authorisation token.

12. An apparatus comprising:

at least one processor; and at least one memory storing instructions of a service communication proxy (SCP) of a mobile communication system, wherein the instructions, when executed by the at least one processor, cause the apparatus to perform:

receiving, from a network function service consumer of the mobile communication system, a first service request for a service exposed by a network function service producer of the mobile communication system; and obtaining, from a network repository function:

(i) an authorisation token to be used to acquire access to the service; and (ii) profile information for the network function service producer, the profile information comprising information about authorisation requirements for the network function service producer;

sending, to the network function service consumer, a service response in reply to the first service request, wherein the service response includes:

(i) the authorisation token to be used to acquire access to the service; and (ii) the profile information for the network function service producer.

13. The apparatus according to claim 12, wherein the information about authorisation requirements for the network function service producer comprises information about authorisation token scopes required by the network function service producer for the service.

14. The apparatus according to claim 12, wherein the operations further comprise:

receiving, from the network function service consumer, a second service request for the service, the second service request comprising a list of scopes for the service;

sending, to the network repository function, a request for another authorisation token specifying an intersection of the list of scopes for the service and a set of authorisation token scopes for the network function service producer;

receiving the another authorisation token from the network repository function;

sending, to the network function service producer, a third service request for the service, the third service request comprising the another authorisation token;

receiving, from the network function service producer, a response to the third service request, the response indicating acceptance of the third service by the network; and sending, to the network function service consumer, a response to the second service request, the response indicating acceptance of the second service request by the network service producer.

\* \* \* \* \*